United States Patent
Eisenhoffer et al.

(10) Patent No.: US 7,107,490 B2
(45) Date of Patent: Sep. 12, 2006

(54) IML-STREAM GENERATED ERROR INSERTION / FRU ISOLATION

(75) Inventors: Andreas Eisenhoffer, Ehningen (DE); Harald Fischer, Wildberg (DE); Helmut Kohler, Moensheim (DE); Norbert Schumacher, Neuhausen (DE)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 10/313,326

(22) Filed: Dec. 6, 2002

(65) Prior Publication Data
US 2003/0126503 A1 Jul. 3, 2003

(30) Foreign Application Priority Data
Jan. 3, 2002 (EP) .................... 02000022

(51) Int. Cl.
*G06F 11/00* (2006.01)
(52) U.S. Cl. .................... 714/30; 714/703
(58) Field of Classification Search ............... 717/134, 717/135; 714/703
See application file for complete search history.

(56) References Cited

U.S. PATENT DOCUMENTS

| | | | | |
|---|---|---|---|---|
| 5,140,593 A * | 8/1992 | Hayashi | .................... | 714/31 |
| 5,229,999 A * | 7/1993 | Cushing et al. | ............ | 714/703 |
| 5,574,853 A * | 11/1996 | Barch et al. | .................. | 714/30 |
| 5,757,811 A * | 5/1998 | Kenmoku et al. | .......... | 714/703 |
| 6,539,503 B1 * | 3/2003 | Walker | .................... | 714/703 |

* cited by examiner

*Primary Examiner*—Robert Beausoliel
*Assistant Examiner*—Philip Guyton
(74) *Attorney, Agent, or Firm*—John E. Campbell; Floyd A. Gonzalez; Heslin, Rothenberg, Farley & Mesiti

(57) ABSTRACT

The present invention relates to a method and system for testing error detection programs dedicated for detecting hardware failures in a computer system, in which error case patterns comprising stimuli values are generated and response patterns to the hardware are evaluated. In order to develop and debug such error detection programs already at an early phase during hardware development it is proposed to feed a simulation model (26) of said hardware with said error patterns, and after running said model, evaluating (12) the model response patterns generated by the simulation model and comparing the response patterns with those expected as a result of the error detection program.

13 Claims, 2 Drawing Sheets

IML-STREAM GENERATED ERROR INSERTION / FRU ISOLATION

BACKGROUND OF THE INVENTION

The present invention relates to hardware and software development, and in particular to a method and system for testing error detection programs dedicated for detecting hardware failures in a computer system, in which error case patterns comprising stimuli values are generated and response patterns to the hardware are evaluated.

Computer systems often have a complex structure that comprises many components, on-chip or off-chip switched to be arranged for tight co-operation with each other. The complexity is even increased when more than one processor unit is coupled with each other or when they co-operate via an electronic network system.

A problem arises when any technical component has a failure which is not made fail-safe by a redundant component. Then, the system operation may be interrupted which—when applied for business purposes—causes high additional costs, in general.

In order to minimize the time required for repairing a hardware failure prior art software programs exist which control the operability and functionability of individual hardware units. Those units may comprise one or more of hardware subunits. In case of a hardware failure the failing technical component may be localized very quickly and technical stuff can replace that component by a new one within relatively short time without a longer time being required for localizing the failing component. Such error detection programs dedicated for detecting hardware failure are referred to in prior art as so-called field-replaceable-unit (FRU) isolation programs. As a matter of fact such programs are complex as well and thus need some time to be developed and be debugged in order to provide sufficient quality.

In prior art, those FRU isolation programs are tested and debugged in close co-operation with the new hardware itself after this has been fabricated at least on a prototype base.

This situation is depicted in FIG. 1: a service element (SE) as e.g. a laptop 10 having installed such FRU isolation program under development is connected via a LAN connection to a computer system 15 in which the newly developed hardware 16 is running.

A separate error generator computer 18 has its own user interface 17 and is arranged to force errors in form of so-called stimuli voltage levels in the hardware itself, forced on latch level for example. Thus, the hardware itself is stimulated with errors.

Then, the error latch status values resulting from this hardware stimulation are read by the service element 10 which runs a respective driver and are evaluated by the FRU isolation software under development.

Usually, after Initial Microprogram Load (IML) at the new hardware 16 the so-called shift-chain-technology is used in order to track a plurality of different paths within a chip. Within a chain a plurality of dedicated latches are tracked and the respective voltage level dependent of a respective time clock is recorded in a view file provided per chain. Thus, such status values can be evaluated and bugs in the FRU program can be found and corrected because the hardware can be selectively fed with a continued sequence of new error stimuli values. Thus, an iterative operation of
a) new hardware stimulation,
b) watching the error propagation effects thereof in the error latches,
c) controlling the FRU-isolation program if it is able to detect those errors,
d) repeated amendment of said FRU-isolation program, is the way in which said FRU isolation program is debugged in prior art comprising two different user interfaces interface 17 for generating errors and user interface 12 for evaluating errors and debugging the FRU-isolation software.

A first disadvantage thereof is that this is a time-consuming, laborious debug procedure.

A second disadvantage of said prior art approach is that the FRU-isolation program can be analyzed for debugging purposes not before the new hardware exists physically in form of at least a prototype base. As, however, the FRU software is an essential component of a new hardware in sale it should be in a releasable status when the hardware itself is releasable. This, however, is not possible in prior art.

SUMMARY OF THE INVENTION

It is thus an objective of the present invention to provide for a method and system adapted to provide for earlier availability of FRU-isolation programs.

According to the broadest aspect of the present invention error patterns, which comprise stimuli values, are generated and are fed to a simulation model of the newly developed hardware. After running said model the model response patterns are evaluated and compared with response patterns expected as a result of the error detection program. In this way a debugging of the FRU-isolation program can take place before the hardware itself is physically present even at a prototype base.

The basic assumption for this inventive approach is, that the underlying hardware simulation model is error-free enough. Thus, in short words the basic principle of the present invention comprises the idea to use the simulation model for debugging the error detection program instead of using the newly developed hardware itself.

A preferred way to implement this is to use a mechanism of which parts are used in prior art for reading out hardware error status values, in particular latches and error registers: An IML-stream. Thus, according to a further preferred aspect of the invention, requiring only a minimum of software development in order to take profit of the invention's aims, this IML-stream mechanism is extended in order to use it for exploring the simulation model:

Thus, basically, within a user debug interface computer, error case patterns are inserted into an IML-stream comprising a sequence of chain commands, and are sent to a cooperating adapter software, i.e., an interface control means, called hypervisor herein, which receives said IML-stream and operates between said user debug interface means and the simulation model, and which converts commands comprised of said IML-stream into stimuli values for the simulation model, and which echoes model response patterns back to the user debug interface.

Further, when providing an input means, e.g., a dedicated file type per chain command for entering one or more stimuli values for a chain within the simulation model, and when providing a status display means, e.g., a further dedicated file type per chain command for viewing status values of simulation model latches when the model is run, then a high degree of user comfort can be provided for viewing latch status values and editing new error patterns. Further, only one user interface is required instead of two in prior art.

Further, the inventional principle can be applied for evaluating statuses of model chains. A chain comprises a plurality of latches in said hardware model, for example. When now a common chain address is used for viewing simulation results on a chain as well as for sticking error values on selected ones of said latches, then the debugging procedure of said error detection program is simplified because the chains have unique IDs for status read and write accesses. Thus, with a view and edit file per chain the user comfort is further increased and debugging is simplified. Error values can be read by a read command in the IML stream, errors statuses can be temporarily set at any error latch with a set command, and can be permanently sticked to such latches with a respective stick command. All commands can advantageously be part of the IML stream which then comprises a respective error insertion.

Further, the temporal extension of error propagation caused by the IML stream can be exploited for generating time-depending errors:

When generating an error value at a latch with a first command at a first chain address at a first early location in the command stream controlling the error case pattern, and when reversing said error value of said latch with a second command of a second chain address at a second later location in the command stream, then even such errors can be generated which have temporary nature only and thus can be localized very difficult in prior art. Further advantageous error generating scenarios may be added using the same or different error latches.

BRIEF DESCRIPTION OF THE DRAWINGS

These and other objects will be apparent to one skilled in the art from the following detailed description of the invention taken in conjunction with the accompanying drawings in which.

DESCRIPTION OF THE PREFERRED EMBODIMENT

Figure 2:
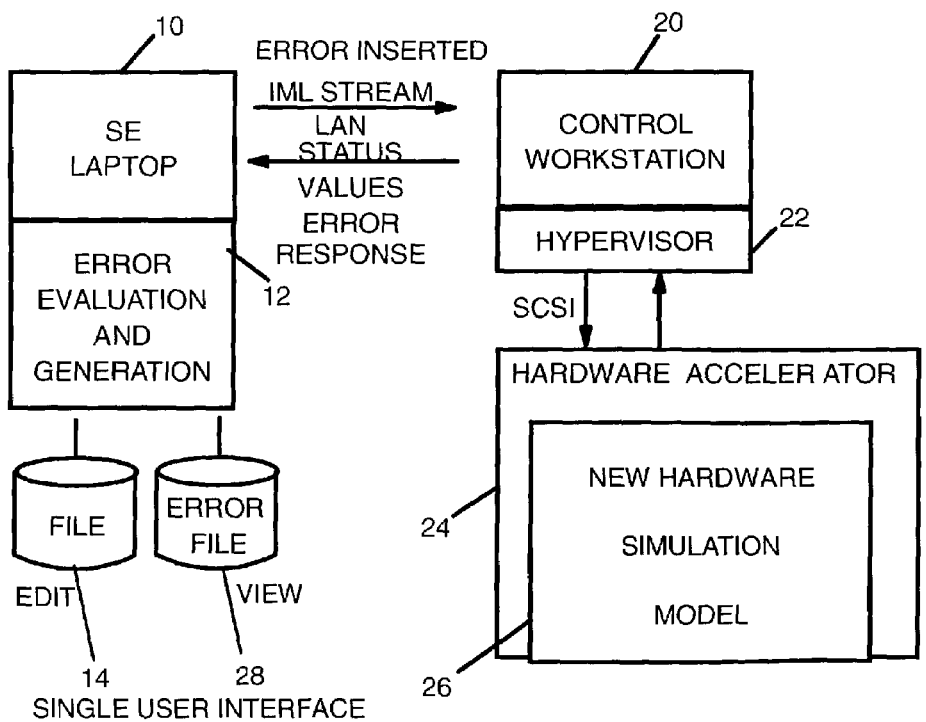
FIG. 2 is a schematic representation in which an exemplary situation shows how a hardware simulation model can be used instead of the hardware itself for debugging the error detecting software.

With general reference to the figures and with special reference now to FIG. 2 the service element laptop 10 has a driver program installed which connects to and drives an inventive piece of software, called hypervisor 22 which is in turn installed on a control workstation 20. Said control workstation 20 is connected to a high performing computer cluster which is referred to as a hardware accelerator 24, via a SCSI bus connection. The hardware accelerator 24—for example comprising a plurality of 64000 CPUs—has loaded a simulation model of the new hardware under development, see reference sign 26.

According to the present inventive embodiment an IML (Initial Program Load) stream is now realised as a bi-directional data stream between said SE laptop 10 and the hardware accelerator 24 via the control workstation 20. Said IML stream comprises a sequence of commands which read and write chains in the model. It should be noted that in prior art the IML stream was used just for setting the hardware 16 into well-defined initial conditions.

In the following, further details are disclosed about the inventive use of said IML-stream, in a preferred embodiment:

Said IML stream has a substructure comprising several steps, e.g., steps 1 to 9 having different tasks, basically. For example, step 1 initializes latch chains and sets some parity bits. Step 4 transfers the bootstrap and processor instructions that are represented by software, i.e., the so-called millicode.

Thus, according to the invention errors are now able to be inserted into the IML-stream:

This is done for example with an inventive SET command describing a chain of latches, and comprising respective chain addresses and respective data.

Or, via a GET command specifying a given chain address a latch chain may be read.

Further, by aid of an inventive STICK command a latch or any signal may be set fixedly to a given value, and may be "frozen" in this status, until said "freezing" is later reversed by a respective UNSTICK command. In this way, the logical value of a latch cannot be overwritten by the simulation model until UNSTICK enables this explicitly.

Thus, for example, step 4 may transfer 16 Mbyte of data into the simulation model. Thus, basically, the IML stream is a combined stream, comprising commands and data used for stimulating the simulation model instead of the hardware itself.

Beyond said chain-related commands further commands are used which are related to control registers, i.e., error registers for tracking error statuses in the simulation model. By that, the behavior of the simulation model may be controlled and a feedback thereof, i.e., the effects of running the model with a given stimuli value configuration can be read out.

When the error detection program shall be tested and debugged, then, first the hardware model is loaded onto the hardware accelerator 24, and then the IML stream is set up in order to define the boundary conditions under which the hardware simulation model 26 is run thereon.

According to the preferred embodiment, the IML stream comprises a command sequence that is first_generated for example on the SE laptop 10 by a dedicated program logic reflecting a given, predetermined model configuration. For example, a long IML stream corresponds to a model implementing a relatively large number of chips, and vice versa. The program logic within said SE 10 generates an IML stream which reflects the specifications of a respective model configuration.

In short words, those commands are received by the hypervisor program 22 and are converted into stimuli values for the hardware simulation model in order to force particular error registers to have a given voltage level, i.e., data content. This is done advantageously during simulation itself, in order to take most profit of the inventive method.

In particular, the IML code stream is a sequence of commands that read and write chains in the model and set the model into various modes like start clock, turn on shift-mode, etc., as this is known in prior art for hardware verification techniques.

Advantageously, each command originated from the service element 10 comprises the shift-chain-address, its lengths and data if required.

According to the preferred embodiment depicted in FIG. 2 all chain-files are provided at hypervisor load-time and contain a unique name for each chain to be accessed during initial micro program load (IML). All chain-files are configured in a configuration file which is read by the hypervisor program 22 when this program begins to decode the IML stream.

An advantageous embodiment for the hypervisor program comprises the approach to locate a configuration file local to the hypervisor program 22 at the control workstation 20, the configuration file comprising all information required to convert the command sequence comprised of the IML stream into the stimuli values which are intended to be forced at the hardware simulation model 26 during runtime thereof.

Figure 1:
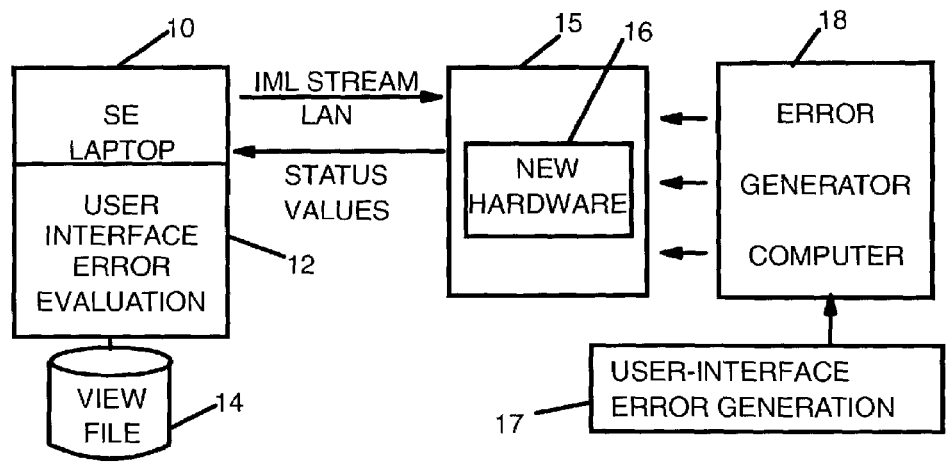
FIG. 1 is a schematic representation of prior art debug situation for error detecting (FRU-isolation) programs.

Thus, basically the hypervisor program 22 is used as a bi-directional converter element between the service element 10 and the hardware simulation model 26. Thus, a comparison to FIG. 1 yields that the hypervisor program 22 is used as an adapter for adapting the prior art situation to the inventive situation in which the hardware simulation model is fed with stimuli values instead of the hardware itself.

The stimulation of the hardware simulation model with the before-mentioned stimuli values provokes a respective response pattern generated by the stimulated running of the model 26, the pattern being received by the hypervisor program 22 and being converted back into an IML stream which is further received by the service element laptop 10 via the same LAN connection that is basically used for both directions. Thus, hypervisor 22 is a bi-directional adapter interface between the service element 10 and the hardware accelerator 26.

Figure 3:
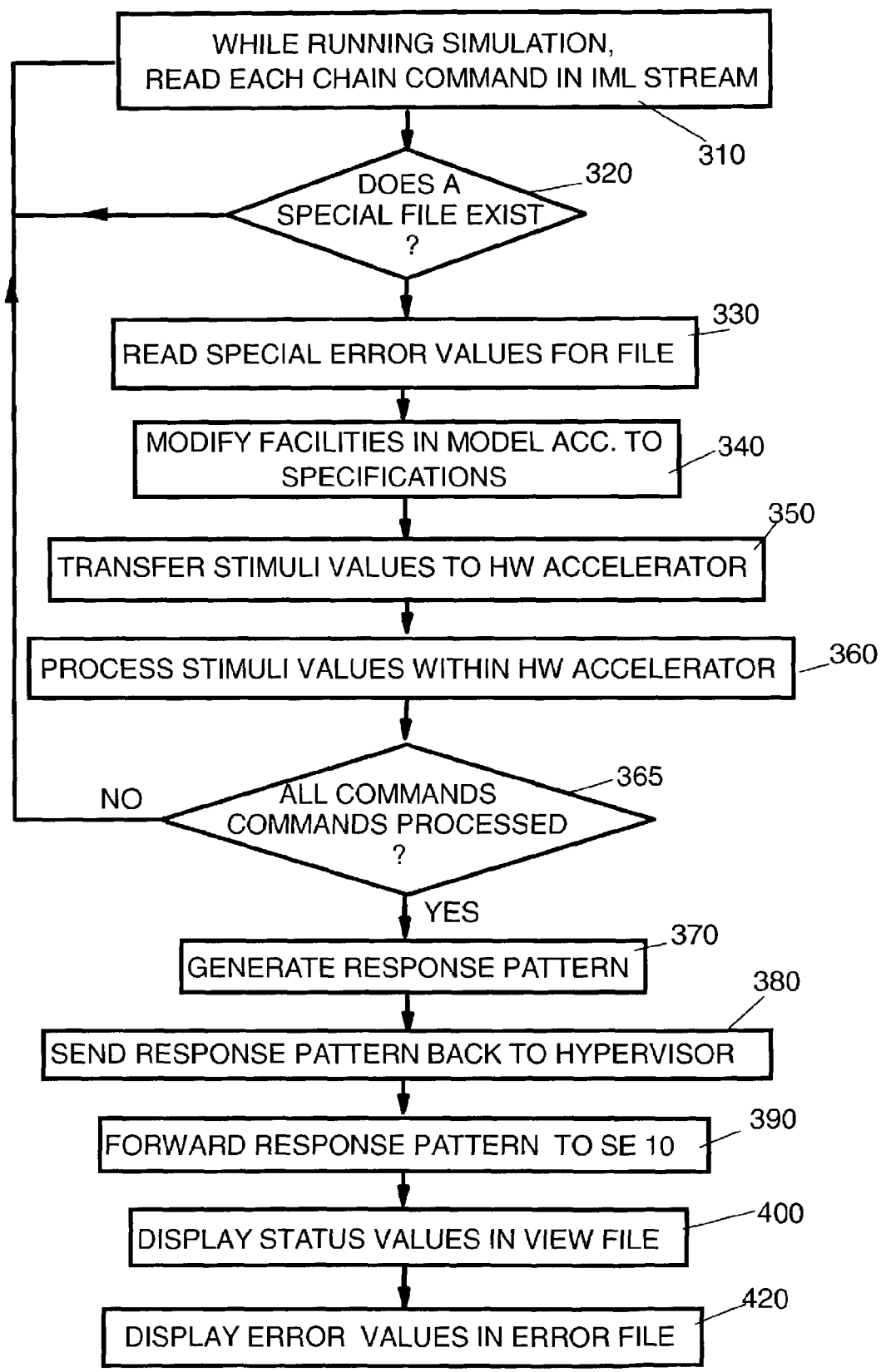
FIG. 3 is a schematic representation showing the basic steps of the control flow in an inventive embodiment.

The processing of the command sequence issued from the service element 10 will be described next in more detail and with additional reference to FIG. 3 which shows the basic steps of the control flow in an inventive embodiment of the hypervisor program component 22:

In particular, a loop for each chain command is processed, defining a sequential order. Said loop begins with a read in step 310 in which the chain command address and other specific data for the chain command are read. Then, it is checked if a file of a predetermined file type, is present within a configuration file accessible by the hypervisor program logic. This leads to a decision 320.

In the YES case thereof the file content is read, step 330, and stimuli values defined therein for particular latches are transferred to the model when the command is executed, in order to "realize" a respective selected value for any desired latch within the simulation model which is member of a given chain. Thus, the simulation model status is actually "vaccinated", i.e. selectively modified at one or more particular locations, step 340, with a particular predetermined value, e.g., in order to simulate a hardware error.

Said stimuli values are transferred, via said SCSI bus or equivalent means as e.g., via fibre channel, to the hardware accelerator 24, step 350 and are processed within the hardware simulation model, step 360. Then, or in the NO branch of decision 320 immediately thereafter, it is branched back to the step 310, for processing the next command. This processing is repeated until all chain commands have been completely processed during simulation, step 365.

Then, by particular virtue of the stimuli values response patterns are generated in during simulation, step 370, which are sent back to the hypervisor program 22, step 380, that forwards it to the evaluation program 12 located on the SE laptop 10, step 390. Said response patterns are then displayed with a view file and a special error file, advantageously:

A view file 14 is advantageously arranged for debugging the error detection program and is arranged for displaying, step 400, all interesting status values on latch-level originated by the hardware simulation model 26 under the influence of the stimuli values issued before. According to a preferred aspect of the invention, this view file 14 can be edited to comprise new error patterns with respective SET or STICK commands referring to the chains mentioned above.

Further, an error file 28 having a type dedicated to display all non-zero facilities, i.e., error showing facilities is displayed to the user, as well in order to provide as much useful information to the debugging staff, step 420.

Advantageously, said view file 14 comprises the basic information required or generating the IML stream.

As it may be appreciated by a person skilled in the art the above-mentioned configuration file is used as a kind of cross reference table for finding a matching entry for each SE-command received from the SE 10 laptop. If a matching entry is found, the respective SE command will be executed, or otherwise the command will be rejected. More advantageously, in order to structure the debugging procedure advantageously, the above mentioned two additional file sets (types) are introduced. Both file sets are accessed when a matching SE-command is received.

The first file set is of the type "*.err_srl". As can be appreciated from the foregoing description, whenever a specific chain is accessed, the hypervisor program 22 tries to open a respective particular file of said first file type and displays all facilities which are non-zero as this is a symbol for an error to be occurred. This is useful to display error/checker latches.

The second file set is of the type "*.view_srl". Also these files are tried to be opened. These files comprise facilities which are generally worth to be observed at each matching chain-command.

According to a preferred aspect of the invention, the view type file is extended such that the hypervisor program 22 can also force shift-chain-facilities to a certain, particular value by interpreting commands out of the above-mentioned view file. In this way a particular facility, for example an Memory Bus Adapter (MBA)—error facility can be stuck to a specific permanent value as e.g. '1' for a specific session. Then, no SE-command will be able to change this value anymore since the SE 10 can access chains only by set/get operations. The next SE read access to this particular chain will then lead to an error condition in the service element 10. The FRU isolation program is now started and can be debugged when trying to identify the FRU using this "virtual hardware". Thus, the FRU code designers can test their code before a real power on of the newly developed hardware.

It should be added that the FRU isolation in the scope of the present invention is limited to the components comprised of the simulation model 26. The content of the simulation model, however, can always be extended and thus can include new components as for example external I/O-attachments whenever they are present in the model.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

The present invention can be realized in hardware, software, or a combination of hardware and software. A test tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following:
A) conversion to another language, code or notation;
b) reproduction in a different material form.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for testing error detection programs dedicated for detecting hardware failures in a computer processor system, said method comprising the steps of:
    generating error case patterns comprising stimuli values, wherein said error case patterns are inserted into an IML-stream including a sequence of chain commands;
    receiving said IML-stream in an interface control operating between a user debug interface and a simulation model;
    converting commands comprised of said IML-stream into stimuli values for the simulation model;
    feeding the simulation model of the hardware with said error case patterns;
    running said simulation model for evaluation of model response patterns generated by the simulation model; and
    echoing model response patterns back to the user debug interface.

2. The method according to claim 1, further comprising the steps of:
    providing an input per chain command for entering one or more stimuli values for a chain within the simulation model; and
    providing a status display per chain command for viewing status values of simulation model latches when the model is run.

3. The method according to claim 1 for evaluating status values of model chains including a chain comprising a plurality of latches in said model, said method further comprising the steps of:
    viewing simulation results on a chain using a common chain address; and
    sticking error values on selected ones of said latches, said sticking error values remaining unchanged until receiving an unstick command.

4. The method according to claim 1 further comprising the step of:
    generating an error value at a latch with a first command at a first chain address at a first location in the command stream; and
    reversing said error value of said latch with a second command at a second chain address at a second location in the command stream.

5. An apparatus for testing error detection programs dedicated for detecting hardware failures in a computer processor system, said apparatus comprising:
    a pattern generator generating error case patterns comprising stimuli values;
    a simulation model receiving said error case patterns of the hardware;
    an evaluator running said simulation model for evaluation of model response patterns generated by the simulation model;
    a display to view simulation results on a chain of said simulation model using a common chain address, said chain comprising a plurality of latches in said simulation model; and
    a module to stick error values on selected ones of said latches, said sticking error values remaining unchanged until receiving an unstick command.

6. The apparatus according to claim 5, wherein said error case patterns are inserted into an IML-stream including a sequence of chain commands, said apparatus further comprising:
    a user debug interface;
    an interface control receiving said IML-stream in an interface control operating between said user debug interface and said simulation model;
    a converter converting commands comprised of said IML-stream into stimuli values for the simulation model; and
    an echoing model echoing response patterns back to the user debug interface.

7. The apparatus according to claim 5, further comprising:
    an input in said simulation model receiving, per chain command, one or more stimuli values for a chain within the simulation model; and
    a status display connected to said simulation model displaying, per chain command, status values of simulation model latches when the model is run.

8. The apparatus according to claim 6 further comprising:
    an error value generator generating an error value at a latch with a first command at a first chain address at a first location in the command stream; and
    a module reversing said error value of said latch with a second command at a second chain address at a second location in the command stream.

9. A program product for use with an apparatus for testing error detection programs dedicated for detecting hardware failures in a computer processor system, said program product comprising;
    a computer readable medium having recorded thereon computer readable program code performing the method comprising the steps of:
        generating error case patterns comprising stimuli values;
        feeding a simulation model of the hardware with said error case patterns, wherein said feeding comprises providing an input per chain command for entering one or more stimuli values for a chain within the simulation model;
        running said simulation model for evaluation of model response patterns generated by the simulation model; and
        providing a status display per chain command for viewing status values of simulation model latches when the model is run.

10. The program product according to claim 9, wherein said error case patterns are inserted into an IML-stream including a sequence of chain commands, said method further comprising the steps of:
- receiving said IML-stream in an interface control operating between a user debug interface and said simulation model;
- converting commands comprised of said IML-stream into stimuli values for the simulation model; and
- echoing model response patterns back to the user debug interface.

11. The program product according to claim 9 for evaluating status values of model chains including a chain comprising a plurality of latches in said model, said method further comprising the steps of:
- viewing simulation results on a chain using a common chain address; and
- sticking error values on selected ones of said latches, said sticking error values remaining unchanged until receiving an unstick command.

12. The program product according to claim 10, said method further comprising the steps of:
- generating an error value at a latch with a first command at a first chain address at a first location in the command stream; and
- reversing said error value of said latch with a second command at a second chain address at a second location in the command stream.

13. A program product comprising:
at least one computer usable medium having computer readable program code logic to facilitate testing of error detection programs dedicated for detecting hardware failure in a computer processor system, the computer readable program code logic performing the method comprising:
- generating error case patterns comprising stimuli values, wherein said error case patterns are inserted into an IML-stream including a sequence of chain commands;
- receiving said IML-stream in an interface control operating between a user debug interface and a simulation model;
- converting commands comprised of said IML-stream into stimuli values for the simulation model;
- feeding the simulation model of the hardware with said error case patterns;
- running said simulation model for evaluation of model response patterns generated by the simulation model; and
- echoing model response patterns back to the user debug interface.

* * * * *